United States Patent [19]

Fujimoto

[11] Patent Number: 5,217,281
[45] Date of Patent: Jun. 8, 1993

[54] BRAKING FLUID PRESSURE CONTROL APPARATUS

[75] Inventor: Tsuyoshi Fujimoto, Itami, Japan

[73] Assignee: Sumitomo Electric Industries, Ltd., Osaka, Japan

[21] Appl. No.: 726,796

[22] Filed: Jul. 8, 1991

[30] Foreign Application Priority Data

Jul. 13, 1990 [JP] Japan .................. 2-186328

[51] Int. Cl.⁵ .......................... B60T 8/44; B60T 8/48; B60T 17/18
[52] U.S. Cl. ................. 303/9.63; 303/114.1; 303/9.72
[58] Field of Search ............ 303/9.62, 9.63, 9.71, 303/9.72, 9.75, 114 R, 116 SP

[56] References Cited

U.S. PATENT DOCUMENTS

| | | | |
|---|---|---|---|
| 4,322,114 | 3/1982 | Maehara | 303/9.63 |
| 4,869,560 | 9/1989 | Nishii | 303/114 R |
| 5,013,098 | 5/1991 | Mergenthaler | 303/114 R |

FOREIGN PATENT DOCUMENTS

| | | |
|---|---|---|
| 0348648 | 1/1990 | European Pat. Off. . |
| 0353506 | 2/1990 | European Pat. Off. . |
| 3508838 | 9/1986 | Fed. Rep. of Germany . |
| 3728953 | 3/1989 | Fed. Rep. of Germany . |
| 0280506 | 7/1990 | Fed. Rep. of Germany ..... 303/9.75 |
| 2653400 | 4/1991 | France ................. 303/87 |
| 104449 | 6/1982 | Japan . |
| 2086509 | 5/1982 | United Kingdom . |

Primary Examiner—Robert J. Oberleitner
Assistant Examiner—Josie A. Ballato
Attorney, Agent, or Firm—Cushman, Darby & Cushman

[57] ABSTRACT

A braking fluid pressure control apparatus is provided including a master cylinder driven by force applied to a brake pedal for generating braking hydraulic pressure; an auxiliary power unit sucking fluid from a reservoir and pressurizing the fluid so as to store the fluid as an auxiliary power source; a booster having a boost chamber for generating boost pressure proportional to force applied to the brake pedal in the boost chamber in receipt of pressure supplied from the auxiliary power unit so that the thrust of the master cylinder is increased by the boost pressure generated by the force applied to the brake pedal and the boost pressure is used as braking pressure. A pressurizing unit housing is provided with a large-diameter opening and a small-diameter opening arranged in series. A first piston is provided which is slidably inserted into the small diameter opening and fluid-sealing the small-diameter opening so as to separate a first cylinder chamber and a second cylinder chamber from each other. A second piston slidably is inserted into the large-diameter opening so as to separate the second cylinder chamber and a third cylinder chamber form each other. A spring is provided for urging the second piston toward the second cylinder chamber and for opening and closing a port. The apparatus permits brakes to operate effectively even if a problem exists in the boost pressure line.

5 Claims, 3 Drawing Sheets

BRAKING FLUID PRESSURE CONTROL APPARATUS

BACKGROUND OF THE INVENTION

1. Field of the Invention

The present invention relates to a braking fluid pressure control apparatus and more particularly to the braking fluid pressure control apparatus in which a part of wheel brake is operated by pressure generated in a hydraulic booster utilizing the pressure of an auxiliary power unit and other wheel brakes are operated by the hydraulic pressure of a master cylinder. The apparatus secures a favorable braking efficiency when a line for introducing the pressure of the auxiliary power unit to a boost chamber or a line for introducing the boost pressure into a pressurizing unit not operating properly and accomplishes a favorable relationship between the stroke of a brake pedal and braking efficiency when the apparatus is normally operating.

2. Description of the Related Arts

A conventional braking system of an automobile comprises an auxiliary power unit for storing hydraulic fluid sucked from a reservoir by a pump and pressurized; and a hydraulic booster utilizing the pressure of the auxiliary unit. The hydraulic booster is used in place of the conventional vacuum type booster. The hydraulic booster facilitates miniaturization of the braking system, i.e., mounted in the automobile by holding the master cylinder and an unlocking control device together as a unit and facilitates the improvement of braking efficiency.

In addition to the above type braking system, the following system is known: That is, the boost pressure of the hydraulic booster increases the thrust of the master cylinder generated by force applied to the brake pedal and instead of static fluid generated by the master cylinder, dynamic fluid having boost pressure generated in a booster chamber is used to pressurize hydraulic fluid communicating with a part of wheel brakes.

According to a mechanism for controlling the pressure of a brake operating cylinder disclosed in Japanese Patent Laid-Open Publication No. 57-104449, hydraulic fluid communicating with a front wheel brake is pressurized by the master cylinder and hydraulic fluid communicating with a rear wheel brake is pressurized by boost pressure. The mechanism comprises a fluid introducing valve for opening and closing a path communicating a boost chamber and the rear wheel brake with each other and a discharge valve for discharging dynamic fluid from the rear wheel brake to a reservoir. Thus, an unlocking device utilizing dynamic fluid for the rear wheel is provided. In this construction, the unlocking device for the rear wheel can be constructed quite simply because the master cylinder is not operated unefficiently.

However, in the above-described pressure control mechanism, hydraulic fluid communicating with the rear wheel brake does not function and the function of the booster is not effectively used when the auxiliary power unit or the rear wheel brake circuit fails. If the boost function cannot be used, the force for operating the brake pedal necessary for obtaining a required braking efficiency increases, that is, even though the brake pedal is operated at a certain force, the braking efficiency is reduced.

In order to reduce the pedalling force necessary for obtaining a required braking efficiency in this state, the master cylinder diameter needs to be reduced. As a result, the pedal stroke becomes large in order to obtain the required braking efficiency.

SUMMARY OF THE INVENTION

It is an essential object of the present invention to provide a braking fluid pressure control apparatus in which the diameter of the master cylinder is set to be small to make pedalling force for obtaining a required braking efficiency small when boost pressure does not rise as a result of the failure of a brake circuit provided between an auxiliary power unit or a boost chamber and wheel brakes. It is an object of the present invention that the brakes operate effectively with a short pedal stroke when the circuit is normally operating although the diameter of the master cylinder is small.

In accomplishing these and other objects, a braking hydraulic pressure controlling apparatus is provided having: a master cylinder driven, by force applied to a brake pedal, for generating braking hydraulic pressure; an auxiliary power unit sucking fluid from a reservoir and pressurizing the fluid so as to store the fluid as auxiliary power source; a booster, having a boost chamber, for generating boost pressure proportional to force applied to the brake pedal in the boost chamber in receipt of pressure supplied from the auxiliary power unit so that the thrust of the master cylinder is increased by the boost pressure generated by the force applied to the brake pedal and the boost pressure is used as braking pressure. The apparatus includes a pressurizing unit having a housing provided with a large-diameter opening and a small-diameter opening arranged in series; a first piston slidably inserted into the small-diameter opening and fluid-sealing the small-diameter opening so as to separate a first cylinder chamber and a second cylinder chamber from each other; a second piston slidably inserted into the large-diameter opening and fluid-sealing the large-diameter opening so as to separate the second cylinder chamber and a third cylinder chamber from each other; means for urging the second piston toward the second cylinder chamber; a port connected with a path communicating the first cylinder chamber and the boost chamber with each other; a port connected with a path communicating the master cylinder and the second cylinder chamber with each other; a port connected with a path for communicating the third cylinder chamber and at least one wheel brake with each other; an open path for communicating the third cylinder chamber and a reservoir with each other; and means for opening and closing a port for communicating the open path and the third cylinder chamber. When the boost pressure is normally operating, in order to operate wheel brakes, the first piston subjected to the boost pressure presses the second piston directly and the hydraulic pressure of the master cylinder applies pressure to the second cylinder chamber so as to move the second piston and operate the means for opening and closing the port. When the boost pressure is abnormally operating, in order to operate the wheel brakes, only hydraulic pressure of the master cylinder acts on the whole area of the head of the second piston to move the second piston and operate the means for opening and closing the port.

According to another preferred embodiment, a braking hydraulic pressure control apparatus including pressure adjusting means comprising three-position changeover valve is, provided on the path communicating the first cylinder chamber and the boost chamber with each other, for selectively communicating the first cylinder chamber with the boost chamber or the reservoir and capable of closing the path so as to adjust, the hydraulic pressure in the first cylinder chamber. Path opening/-closing means are provided on the path for communicating the master cylinder and the second cylinder chamber with each other. An intermediate chamber is provided fluid-sealed by both ends of the second piston. The apparatus also includes a path for communicating the intermediate chamber and the master cylinder with each other and means for opening and closing the path communicating the intermediate chamber and the second cylinder chamber with each other so as to perform an unlocking operation when the pressure of the auxiliary power unit is normally operating.

According to still another preferred embodiment, a braking hydraulic pressure control apparatus further includes means comprising a change-over valve, provided on the upstream side of the pressure adjusting means provided on the path communicating the first cylinder chamber and the boost chamber with each other, for selectively communicating the first cylinder chamber with the boost or the auxiliary power unit with each other so as to perform a traction control by introducing the pressure of the auxiliary power unit directly into the first cylinder chamber.

As described above, the rear wheel brake is operated by boost pressure and the front wheel brake is operated by pressure generated in the master cylinder chamber and the boost pressure. When the braking system of the apparatus is normally operating, a certain volume of hydraulic fluid proportional to the boost pressure is supplied from the boost chamber to the front wheel brake via the pressurizing unit in addition to the master cylinder hydraulic pressure. Therefore, even a short pedal stroke brings about a favorable braking efficiency even though the diameter of the master cylinder is small. Accordingly, even though the circuit between the auxiliary power unit and the rear wheel brake or the circuit between the boost chamber and the rear wheel brake is not operating properly and accordingly, the rear wheel brake does not operate, a required braking effect can be obtained on the front wheel brake by applying a small force to the brake pedal.

Accordingly, the braking system of the invention can be used in a wide range, i.e., applied to a heavy automobile as well. In addition, the braking system including an unlocking device and a traction control device can be constructed by selectively communicating the first cylinder chamber of the pressurizing unit with the reservoir or the auxiliary driving unit regardless of the driving system and weight distribution of an automobile.

Furthermore, in the pressurizing unit, the first piston can be moved from the original position thereof adjacent to the return position (original position) of the second piston to the first cylinder chamber. Therefore, if an excessive force is applied to the braking system, the pressure of the braking fluid does not exceed the pressure of the auxiliary power unit. Thus, the apparatus assures a user reliability.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
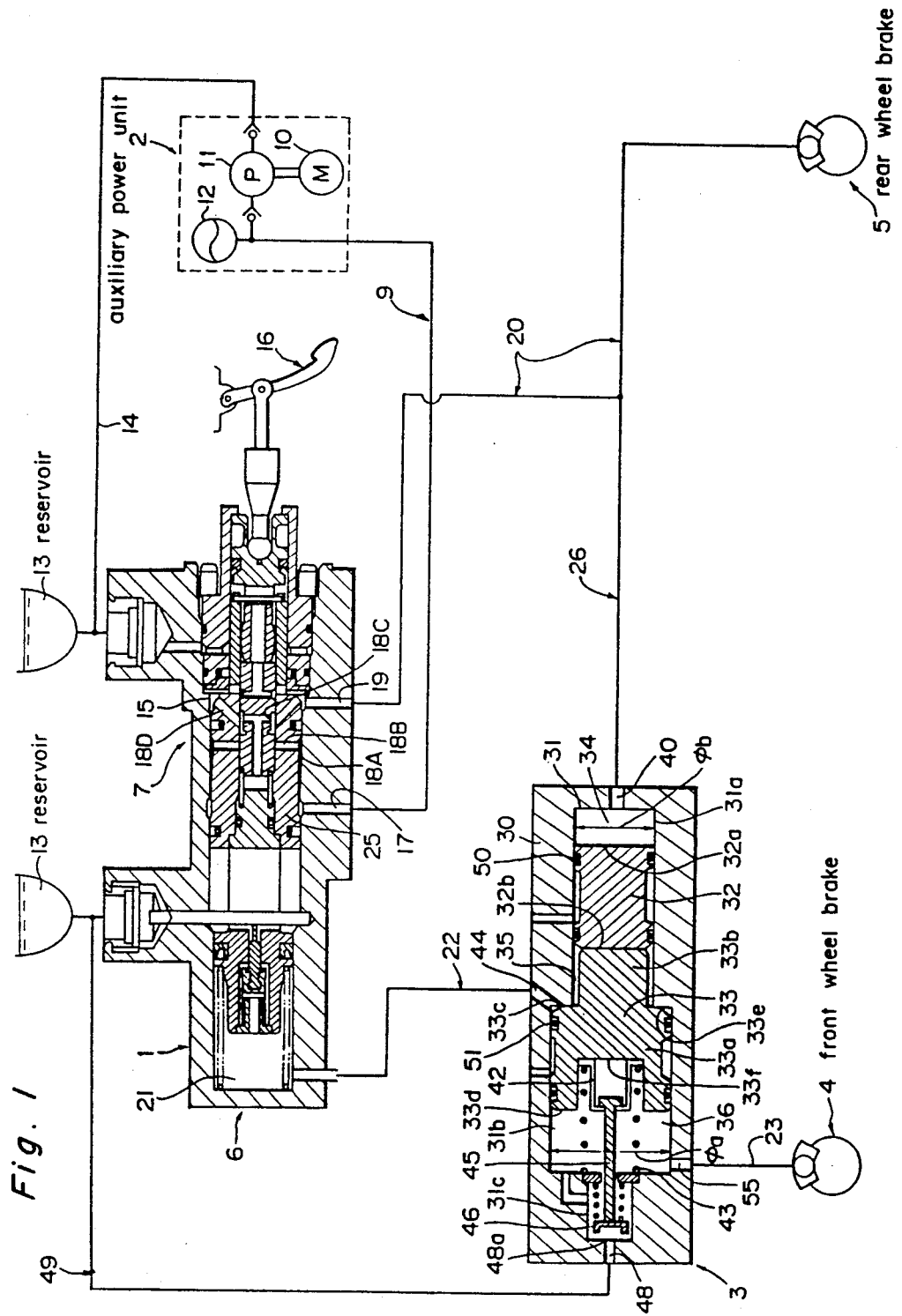
FIG. 1 is a construction view showing a braking system according to a first embodiment of the present invention.

Before the description of the present invention proceeds, it is to be noted that like parts are designated by like reference numerals throughout the accompanying drawings.

Referring to the drawings, a braking fluid pressure control apparatus according to a first embodiment of the present is described below.

Referring to FIG. 1 showing the first embodiment, the apparatus comprises a braking unit 1, an auxiliary power unit 2, a pressurizing unit 3, a front wheel brake 4, and a rear wheel brake 5. The pressurizing unit 3 supplies to the front wheel brake 4 a volume of fluid necessary for shortening the stroke of a master cylinder 6 provided in the braking unit 1.

The braking unit 1 has a known construction incorporating the master cylinder 6 and a hydraulic booster 7. High auxiliary pressure is supplied from the auxiliary power unit 2 to the booster 7 via a path 9. The auxiliary power unit 2 comprises a motor 10, a pump 11, and an accumulator 12. The auxiliary power unit 2 sucks hydraulic fluid from a reservoir 13 via a path 14 and pressurizes it, thus always storing high pressure auxiliary pressure in the accumulator 12.

The booster 7 including a boost chamber 15 supplies the pressure from the auxiliary power unit 2 to a port 17 of the braking unit 1 upon operation of a brake pedal 16, thus introducing the pressure of the auxiliary power unit 2 to the boost chamber 15 via paths 18A through 18D and generating boost pressure proportional to the operation force applied to the brake pedal 16 in the boost chamber 15. Thus, a boost piston 25 is pressed by the boost pressure, which increases the thrust of the master cylinder 6 generated by the force applied to the brake pedal 16.

The boost chamber 15 communicates with the rear wheel brake 5 via a port 19 and a path 20. Simultaneously with the pressure application to the rear wheel brake 5 by means of the boost pressure, the boost pressure is introduced into the pressurizing unit 3 via a path 26 branching from the path 20. As will be described later, the boost pressure introduced into the pressurizing unit 3 pressurizes hydraulic pressure to be applied to the front wheel brake 4. Pressure generated in a master cylinder chamber 21 of the braking unit 1 is introduced into the front wheel brake 4 via a path 22, the pressurizing unit 3, and a path 23. That is, the master cylinder hydraulic pressure is introduced into the front wheel brake 4 after the master cylinder hydraulic pressure is subjected to the boost pressure in the pressurizing unit 3.

The pressurizing unit 3 has a stepped opening 31 in a housing 30. The stepped opening 31 has a small-diameter opening 31a of diameter (b) on the right side thereof, a large-diameter opening 31b of diameter (a) in the middle portion thereof, and a minimum diameter opening 31c on the left side thereof. These three openings are arranged in series. A first piston 32 is slidably provided in the small-diameter opening 31a and a first cylinder chamber 34 of a small diameter (b) is formed between one end surface 32a of the first piston 32 and the end surface of the small-diameter opening 31a. A large-diameter portion 33a of a second piston 33 is slidably inserted into the large-diameter opening 31b. A small-diameter portion 33b of the second piston 33 is inserted into the small-diameter opening 31a with a space provided therebetween. Therefore, there is provided a second cylinder chamber 35, one of which is defined by the other end surface 32b of the first piston 32 and the other end of which is defined by one end surface 33c of the large-diameter portion 33a of the second piston 33. In the large-diameter opening 31b, a third cylinder chamber 36 of a diameter (a) is formed between the other end surface 33d of the large-diameter portion of the second piston 33 and the end surface of the large-diameter opening 31b. Seals 50 and 51 are provided on the peripheral surface of the first piston 32 and the large-diameter portion 33a of the second piston 33, respectively so as to fluid-seal the first, second, and third cylinder chambers 34, 35, and 36 by means of the first and second pistons 32 and 33.

A boost pressure introducing port 40 is provided at one end surface of the housing of the first cylinder chamber 34 so as to communicate the port 40 with the path 26. Thus, the boost pressure is introduced into the first cylinder chamber 34, thereby acting on the first piston 32. A cut-away portion 33e is formed on the peripheral edge of one end surface 33c of the large-diameter portion of the second piston 33 and a concave 33f is formed in the center of the other end surface 33d of the large-diameter portion thereof. A supporting member 42 serving as a member for receiving a spring and a valve is inserted into the concave portion 33f, and a spring 43 is provided between the supporting member 42 and the end surface of the large-diameter opening 31b so as to urge the second piston 33 toward the second cylinder chamber 35. A port 44 for introducing master cylinder hydraulic pressure is formed in the corner of one end surface, of the large-diameter opening 31b, opposed to the small-diameter opening 31a. When the second piston 33 is at the rest position (return position) thereof at which one end surface 33c of the large-diameter portion of the second piston 33 is stopped owing to its contact with the end wall of the large-diameter opening 31b caused by the spring 43, the master cylinder hydraulic pressure introduced from the path 22 into the pressurizing unit 3 via the port 44 flows into the second cylinder chamber 35 from the cutaway portion 33e. As a result, the second piston 33 is pressed toward the third cylinder chamber 36.

One end of the valve 45 is fixed to the supporting member 42 mounted on the second piston 33 and the other end thereof projects into the minimum diameter opening 31c communicating with the third cylinder chamber 36. A sealing member 46 is fixed to the other end of the valve 45. A port 48 for circulating hydraulic fluid is formed at the end surface of the minimum diameter opening 31c so as to communicate the port 48 with the reservoir 13 via an open path 49. When the second piston 33 is pressed and moved by the master cylinder hydraulic pressure, the sealing member 46 is moved in unison with the movement of the second piston 33, thus closing the port 48. That is, the sealing member 46 serves as a means for opening and closing the valve 45 and the port 48. A port 55 communicating with the front wheel brake 4 via a path 23 is formed in the third cylinder chamber 36. When the sealing member 46 closes the port 48 as a result of the introduction of the master cylinder hydraulic pressure and the boost pressure, hydraulic fluid is introduced from the pressurizing unit 1 into the front wheel brake 4 via the port 55. When the port 48 is opened, the hydraulic fluid flows from the front wheel brake 4 to the reservoir 13 via the third cylinder chamber 36 and the minimum diameter opening 31c.

The operation of the apparatus of the above construction is described below. When the circuit of the auxiliary power unit 2 or the circuit for the rear wheel brake 5 is normally operating and the boost pressure normally rises when the brake pedal 16 is operated, the boost hydraulic fluid is introduced from the boost chamber 15 into the rear wheel brake 5 via the path 20, thus pressurizing the rear wheel brake 5 and simultaneously, and flows into the first cylinder chamber 34 of the pressurizing unit 3 via the path 26. As a result, the second piston 33 is moved toward the third cylinder chamber 36 through the first piston 32 and the valve 45 fixed to the second piston 33 is operated in unison with the movement of the second piston 33. Consequently, the sealing member 46 positioned at the top of the valve 45 is brought into contact with the valve seat 48a of the port 48. Accordingly, the port 48 is closed, so that the third cylinder chamber 36 and the reservoir 13 do not communicate with each other. Simultaneously, hydraulic fluid generated in the master cylinder chamber 21 passes through the path 22, thus flowing into the second cylinder chamber 35 via the port 44 of the pressurizing unit 3. As a result, the second piston 33 is pressed toward the third chamber 36 by the hydraulic fluid generated in the master cylinder chamber 21 and the first piston 32 moved by the boost pressure. That is, pressure is applied to the front wheel brake 4 by both the working fluid, having a volume proportional to the boost pressure, supplied to the first cylinder chamber 34 of the pressurizing unit 3 and the hydraulic fluid supplied from the pressurizing chamber 21 of the master cylinder 6 in the braking unit 1. More specifically, owing to the pressurizing operation of the boost pressure in the pressurizing unit 3, the amount of fluid which the master cylinder supplies to the front wheel 4 is:

$$(a^2 - b^2)/a^2$$

of the amount of fluid which the front wheel brake 4 requires,
where (b) is the diameter of the first cylinder chamber 34 and (a) is the diameter of the third cylinder chamber 36 of the pressurizing unit 3. Thus, the amount of the hydraulic fluid to be supplied from the master cylinder 6 to the front wheel brake 4 can be reduced. Therefore, even though the diameter of the master cylinder 6 is small, a short pedal stroke is enough for the front wheel brake 4 to provide a required braking efficiency because of the above-described reason.

As described above, according to the braking system of the embodiment, even a short pedal stroke provides a favorable braking efficiency, i.e., the front wheel brake 4 is capable of performing its function favorably even though the diameter of the master cylinder 6 is small.

If the circuit or the line connected with the auxiliary power unit 2 and the boost chamber 15 or the path 20 connected with the rear wheel brake 5 is not operating properly, the pressure of the boost chamber 15 does not rise and accordingly, the boost pressure is not introduced into the first cylinder chamber 34 of the pressurizing unit 3. Therefore, the first piston 32 remains at the original position In this case, the pressure in the master cylinder chamber 21 of the braking unit 1 is pressurized not by the boost pressure, but manually. Hydraulic pressure generated in the master cylinder 21 flows into the second cylinder chamber 35 via the path 22 and the port 44, similarly to a normal condition. At this time, since the second piston 33 moves away from the first piston 32, the hydraulic fluid acts on the entire area of the head of the second piston 33, thus pressing it toward the third cylinder chamber 36. As described above, the diameter of the master cylinder 6 is set so that a sufficient braking performance can be obtained even though the brake pedal is operated by a small force. But in this case, the pedal stroke becomes larger than that required in normal time because the amount of fluid supplied by the master cylinder to the front wheel brake 4 corresponds to the amount of fluid required by the front wheel brake 4.

Figure 2:
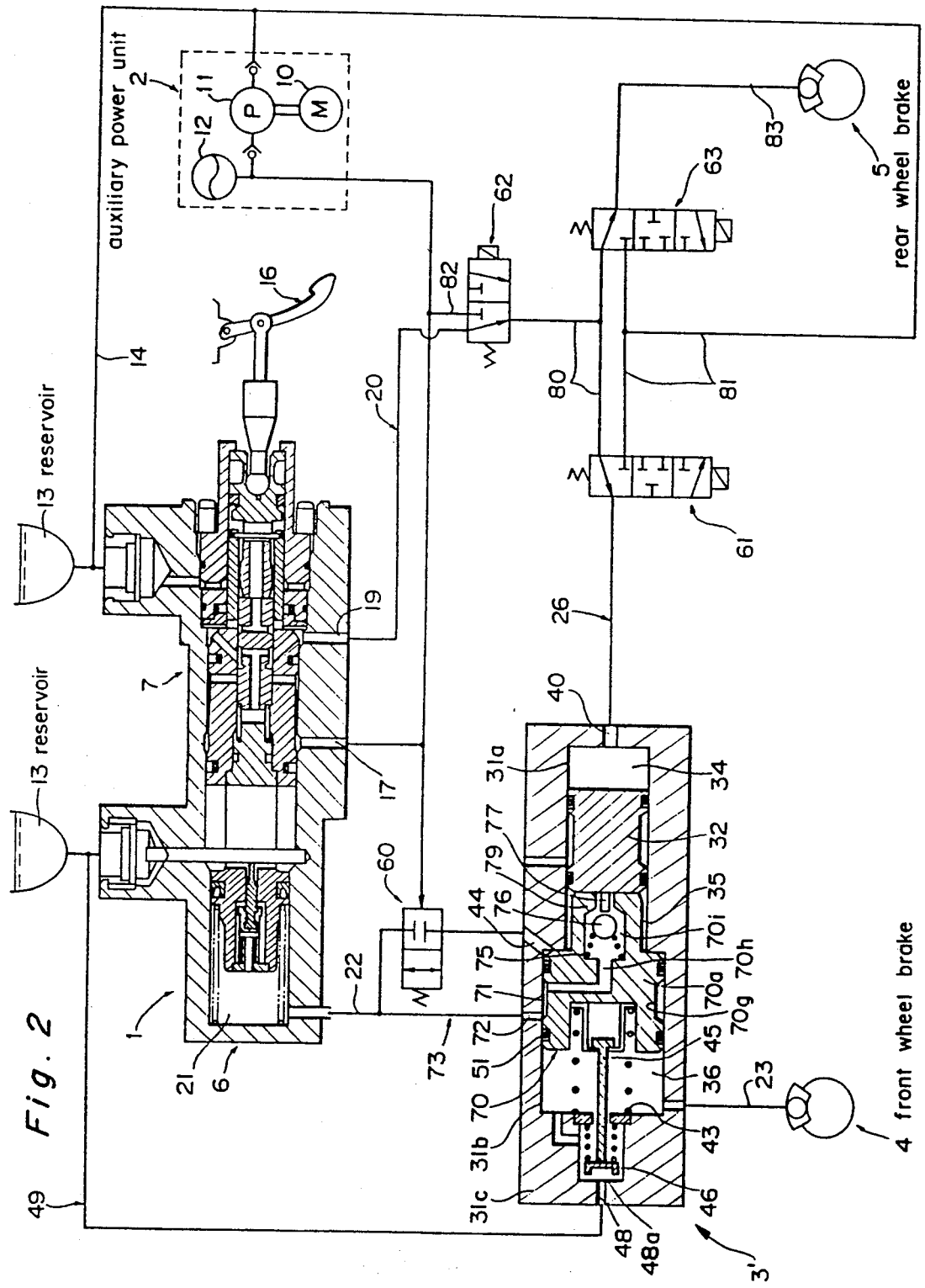
FIG. 2 is a construction view showing a braking system according to a second embodiment of the present invention.

A second embodiment of the present invention is described below with reference to FIG. 2. According to the second embodiment, an unlocking operation is possible when the pressure of the auxiliary power is normally operating.

According to the second embodiment, change-over valves 61, 62, 63 which are operated by electric signals are provided and the construction of a second piston 70 of a pressurizing unit 3' is modified. The change-over valve 60 is a kind of auxiliary pressure operating valve, which is normally closed and opens at low pressure. That is, in the second piston 70, a concave 70g is defined on the peripheral surface of a large-diameter portion 70a thereof and an intermediate chamber 71, both ends of which are fluid-sealed by a seal 51 is formed between the concave 70g and the inner peripheral surface of the large-diameter opening 31b. A port 72, for introducing the master cylinder hydraulic pressure, communicating with the intermediate chamber 71 is provided in the housing of the pressurizing unit 3' and connected with a path 73 branching from the path 22. The intermediate chamber 71 always communicates with the master cylinder chamber 21 via the paths 73 and 22. The change-over valve 60 serving as a means for opening and closing the path between the master cylinder chamber 21 and the second cylinder chamber 35 is provided on the path 22 such that the change-over valve 60 is downstream of the branching point of the paths 22 and 73. The change-over valve 60 is at the closed position as shown in FIG. 2 except when the system of the auxiliary power unit is not operating properly. That is, when the system is not operating properly due to a system failure, the change-over valve 60 is changed over from the closed position to the open position so as to introduce the master cylinder hydraulic pressure into the port 44 of the pressurizing unit 3' similarly to the first embodiment.

Inside the second piston 70, in order to communicate the intermediate chamber 71 and the second cylinder chamber 35 with each other, a fluid path comprising an L-shaped path 70h and a check valve chamber 70i is formed and a path opening/closing means comprising a valve ball 76 urged by a spring 75 is provided in the check valve chamber 70i. The check valve chamber 70i is opened in the end surface of the small-diameter portion 70b (not shown) of the second piston 70 and a valve opening pin 77 projects from the end surface of the first piston 32 opposed to the opening portion of the check valve chamber 70i. When the first piston 32 is brought into contact with the second piston 70, the valve opening pin 77 projects into the check valve chamber 70i, thus moving the valve ball 76 from a valve seat 79 against the urging force of the spring 75. In this manner, the intermediate chamber 71 and the second cylinder chamber 35 communicate with each other.

The three-position change-over valve 61 serving as a means for adjusting the hydraulic pressure of the first cylinder chamber 34 is provided on the path 26 through which the boost pressure is introduced into the port 40 formed in the first cylinder chamber 34 of the pressurizing unit 3'. That is, the path 26 is closed or selectively communicates with a hydraulic pressure introducing path 80 or a hydraulic pressure discharge path 81 connected with the reservoir 13 via the change-over valve 61. The two-position change-over valve 62 is provided on the hydraulic pressure introducing path 80 upstream of the change-over valve 61 so as to selectively connect the hydraulic pressure introducing path 80 with the path 20 communicating with the boost chamber 15 or the path 82 communicating with the auxiliary power unit 2. When the pressure of the auxiliary power is normal, the boost pressure is introduced into the first cylinder chamber 34 of the pressurizing unit 3' with the change-over valves 62 and 61 taking the position as shown in FIG. 2. Via a three-position change-over valve 63, the hydraulic pressure introducing path 80 or the hydraulic pressure discharge path 81 is connected with a path 83 connected with the rear wheel brake 5.

The operation of the apparatus according to the second embodiment is described below. When the boost pressure is in a normal condition, the mast cylinder hydraulic pressure flows into the intermediate chamber 71 of the pressurizing unit 3' via the paths 22 and 73, and the first piston 32 is pressed by the boost pressure introduced into the first cylinder chamber 34. As a result, the valve opening pin 77 mounted on the first piston 32 presses the valve ball 76, thus opening the check valve and consequently, the master cylinder hydraulic fluid which is introduced into the intermediate chamber 71 flows into the second cylinder chamber 35. Accordingly, similarly to the first embodiment, the second piston 33 is pressed by the master cylinder hydraulic fluid and the first piston 32 pressed by the boost pressure. As a result, the second piston 33 moves toward the third cylinder chamber 36. Hydraulic pressure thus generated pressurizes the front wheel brake 4. The boost hydraulic fluid flows into the rear wheel brake 5 via the paths 20, 80, and 83.

When it is necessary to reduce the pressure of the braking fluid in order to perform an unlocking operation, the change-over valve 61 is switched over to communicate the path 26 with the hydraulic pressure discharge path 81 so that the first cylinder chamber 34 communicates with the reservoir 13. Therefore, the hydraulic fluid in the first cylinder chamber 34 flows back to the reservoir 13, thereby reducing the pressure in the first chamber 34. As a result, the first piston 32 moves toward the first cylinder chamber 4 and in unison with the movement of the first piston 32, the valve opening pin 77 moves in the same direction. Then, the spring 75 causes the valve ball 76 to contact the valve seat 79, with the result that the valve ball 76 interrupts the communication between the intermediate chamber 71 and the second cylinder chamber 35. Accordingly, the master cylinder chamber hydraulic fluid which has flowed into the intermediate chamber 71 is not supplied to the second cylinder chamber 35 and the first piston 32 moves toward the first cylinder 34 as described above. As a result, the volume in the second cylinder chamber 35 increases and the pressure therein is reduced. Accordingly, the second piston 70 urged by the spring 43 is moved toward the first cylinder chamber 34 and the volume in the third cylinder chamber 36 increases, with the result that the pressure of the braking fluid for the front wheel brake 4 is reduced. In order to return the second piston 70 to the original position, an allowance for a return stroke is provided for the first piston 32. At this time, the change-over valve 63 is switched over to communicate the path 83 with the path 81. As a result, the pressure of the braking fluid for the rear wheel brake 5 is reduced.

If it is necessary to apply pressure to the braking fluid communicating with the wheel brake in order to perform a traction control operation in spite of a pedal operation, the change-over valve 62 is changed over by an electric signal so as to communicate the path 80 with the auxiliary power unit 2, i.e., the pressure of the auxiliary power unit 2 is directly introduced into the rear wheel brake 5 and pressurized. At this time, the pressure of the auxiliary power unit 2 is directly introduced into the first cylinder chamber 34 of the pressurizing unit 3'. As a result, the first piston 32 is pressed, thus pressing the second piston 70 to move it toward the third cylinder chamber 36. Thus, pressure can be applied to the braking fluid adapted for the front wheel brake 4.

If the system, or the circuit or the line of the auxiliary power unit 2 has failed, the change-over valve 60 is switched over to directly introduce the hydraulic fluid in the master cylinder into the second cylinder chamber 35 via the path 22. Accordingly, regardless of whether the check valve inside the second piston 70 is opened or closed, i.e., even though the valve ball 76 is not opened by the valve opening pin 77 because the first piston 32 is not pressed by the boost pressure and therefore the check valve is in the closed state, the second piston 70 is moved by the hydraulic fluid in the master cylinder introduced into the second cylinder chamber 35. Accordingly, the braking fluid communicating with the front wheel brake 4 is pressurized similarly to the first embodiment.

As described above, the apparatus according to the second embodiment is capable of coping with the failure of the system of the auxiliary power unit and performing a pressure reducing operation during an unlocking operation and a traction control operation.

Figure 3:
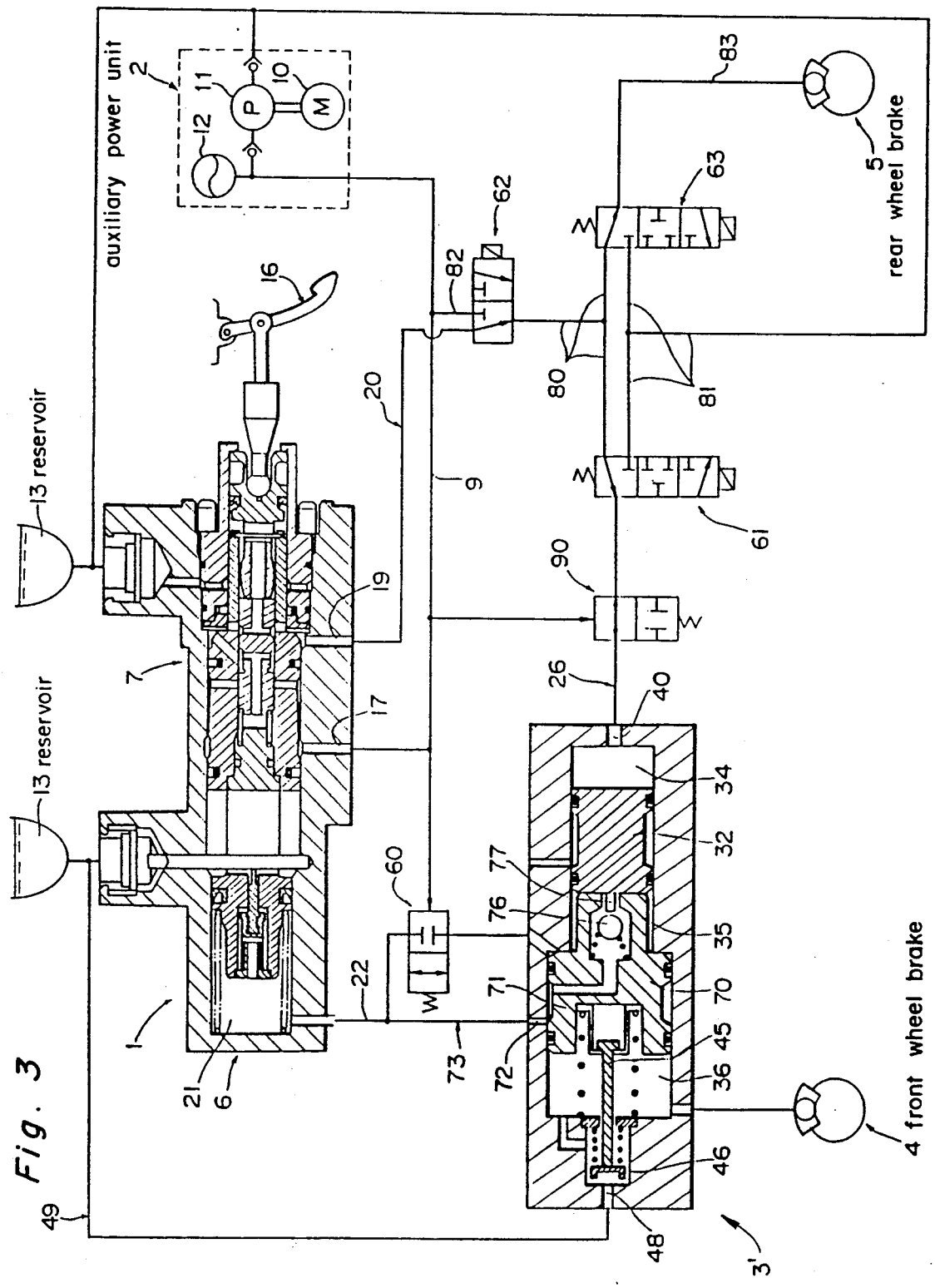
FIG. 3 is a construction view showing a braking system according to a third embodiment of the present invention.

A third embodiment shown in FIG. 3 is different from the second embodiment in that a change-over valve 90 is provided on the path 26 communicating the boost pressure introducing port 40 formed in the first cylinder 34 of the pressurizing unit 3' and the change-over valve 61 with each other. The change-over valve 90 is positioned between the port 40 and the change-over valve 61. In case of the failure of the pressure of the auxiliary power unit 2, the change-over valve 90 is switched over to close the path 26. The closure of the path 26 prevents the volume change in the first cylinder 34 and the movement of the first piston 32 toward the first cylinder chamber 34. Accordingly, the master cylinder hydraulic pressure acts on the second cylinder chamber 35 so that the second piston 70 is pressed toward the third cylinder chamber 36, thereby reducing the loss stroke of the master cylinder. Since the other operations of the third embodiment is the same as that of the second embodiment, the description thereof is omitted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A braking hydraulic pressure controlling apparatus comprising:

a master cylinder driven by force applied to a brake pedal for generating braking hydraulic pressure;

an auxiliary power unit drawing fluid from a reservoir and pressurizing said fluid so as to store said fluid as an auxiliary power source;

a booster having a boost chamber for generating boost pressure proportional to force applied to the brake pedal in said boost chamber in receipt of pressure supplied from said auxiliary power unit so that the thrust of said master cylinder is increased by said boost pressure, generated by the force applied to the brake pedal, said boost pressure being used as braking pressure;

a housing having a large-diameter opening and a small-diameter opening arranged in series;

a first piston slidably inserted into said small diameter opening and fluid-sealing said small-diameter opening so as to separate a first cylinder chamber and a second cylinder chamber from each other;

a second piston slidably inserted into said large-diameter opening and fluid sealing said large-diameter opening so as to separate said second cylinder chamber and a third cylinder chamber form each other;

means for urging said second piston toward said second cylinder chamber;

a first path permitting said first cylinder chamber and said boost chamber to communicate with each other;

a second path permitting said master cylinder and said second cylinder chamber to communicate with each other;

a third path permitting said third cylinder chamber and at least one wheel brake to communicate with each other;

an open path permitting said third cylinder chamber and a reservoir to communicate with each other;

means for opening and closing a port permitting said open path and said third cylinder chamber to communicate with each other, said first piston being subjected to the boost pressure so that the first piston directly presses said second piston and the hydraulic pressure of said master cylinder applying pressure to said second cylinder chamber so as to move said second piston and operate said means for opening and closing said port, in order to operate wheel brakes when the boost pressure is normally operating, hydraulic pressure of said master cylinder only acting on an entire area of a head of said second piston so as to move said second piston and operate said means for opening and closing said port, in order to operate the wheel brakes when the boost pressure is not normally operating.

2. A braking hydraulic pressure controlling apparatus comprising:
- a master cylinder driven by force applied to a brake pedal for generating braking hydraulic pressure;
- an auxiliary power unit drawing fluid from a reservoir and pressurizing said fluid so as to store said fluid as an auxiliary power source;
- a booster having a boost chamber for generating boost pressure proportional to force applied to the brake pedal in said boost chamber in receipt of pressure supplied from said auxiliary power unit so that the thrust of said master cylinder is increased by said boost pressure, generated by the force applied to the brake pedal, said boost pressure being used as braking pressure;
- a housing having a large-diameter opening and a small-diameter opening arranged in series;
- a first piston slidably inserted into said small diameter opening and fluid-sealing said small-diameter opening so as to separate a first cylinder chamber and a second cylinder chamber from each other;
- a second piston slidably inserted into said large-diameter opening and fluid sealing said large-diameter opening so as to separate said second cylinder chamber and a third cylinder chamber form each other;
- means for urging said second piston toward said second cylinder chamber;
- a first path permitting said first cylinder chamber and said boost chamber to communicate with each other;
- a second path permitting said master cylinder and said second cylinder chamber to communicate with each other;
- a third path permitting said third cylinder chamber and at least one wheel brake to communicate with each other;
- an open path permitting said third cylinder chamber and a reservoir to communicate with each other;
- means for opening and closing a port permitting said open path and said third cylinder chamber to communicate with each other, said first piston being subjected to the boost pressure so that the first piston directly presses said second piston and the hydraulic pressure of said master cylinder applying pressure to said second cylinder chamber so as to move said second piston and operate said means for opening and closing said port, in order to operate wheel brakes when the boost pressure is normally operating, only hydraulic pressure of said master cylinder acting on an entire area of a head of said second piston so as to move said second piston and operate said means for opening and closing said port, in order to operate the wheel brakes when the boost pressure is not normally operating; and
- pressure adjusting means, provided on said first path for selectively permitting said first cylinder chamber to communicate with one of said boost chamber and said reservoir and capable of closing said first path so as to adjust the hydraulic pressure in said first cylinder chamber;
- path opening and closing means provided on said second path for communicating said master cylinder and said second cylinder chamber with each other;
- an intermediate chamber fluid-sealed by both ends of said second piston;
- a path for communicating said intermediate chamber and said master cylinder with each other; and
- means for opening and closing the path communicating said intermediate chamber and said second cylinder chamber with each other, an unlocking braking operation being performed when the pressure of said auxiliary power unit is normally operating.

3. A braking hydraulic pressure control apparatus as claimed in claim 2, wherein said first piston moves from an original position thereof to said first cylinder chamber with respect to a rest position of said second piston.

4. A braking hydraulic pressure control apparatus as claimed in claim 2, further comprising means, provided on an upstream side of said pressure adjusting means provided on said first path, for selectively permitting a circuit provided on a downstream side thereof and the path of said auxiliary power unit to communicate with each other.

5. A braking hydraulic pressure control apparatus as claimed in claim 3, wherein said first piston remains at the rest position when said auxiliary power unit is not operating properly.

* * * * *